United States Patent [19]
Gilchrist et al.

[11] 3,755,189

[45] Aug. 28, 1973

[54] COMPOSITION FOR THE CONTROL OF OILS FLOATING ON WATER

[75] Inventors: Ralph E. Gilchrist; Jack C. Cox, both of Houston, Tex.

[73] Assignee: Tenneco Oil Company, Houston, Tex.

[22] Filed: Sept. 24, 1971

[21] Appl. No.: 183,620

[52] U.S. Cl................ 252/316, 106/252, 106/253, 106/264, 210/42, 210/DIG. 21
[51] Int. Cl............................................. B01j 13/00
[58] Field of Search................................... 252/316; 210/DIG. 21; 106/252, 253, 264, 310

[56] References Cited
UNITED STATES PATENTS

| | | | |
|---|---|---|---|
| 3,272,758 | 9/1966 | De Lew et al. | 252/354 |
| 1,916,805 | 7/1933 | Meidert et al. | 106/310 |
| 1,971,636 | 8/1934 | Baldwin | 106/252 X |
| 2,692,208 | 10/1954 | Fisher | 106/252 |
| 2,717,214 | 9/1955 | Marotta et al. | 106/253 X |
| 2,807,553 | 9/1957 | Fischer | 106/310 X |
| 3,198,731 | 8/1965 | De Lew | 210/42 |

*Primary Examiner*—Richard D. Lovering
*Attorney*—Eugene S. Coddou and Carlos A. Torres

[57] ABSTRACT

A composition of matter suitable for the confinement of oil floating on water consisting essentially of a drying oil, a carrier selected from the class consisting of liquid alcohols, ketones and ethers, and a water insoluble metallic soap catalyst. The composition is used to control oil slicks on water by dispersing said composition on the surface of the slick in an amount sufficient to confine the oil slick and thereby allow removal thereof.

4 Claims, No Drawings

COMPOSITION FOR THE CONTROL OF OILS FLOATING ON WATER

BACKGROUND OF THE INVENTION

The present invention relates to the treatment of oil slicks and spills on the surface of bodies of water and more particularly to compositions of matter suitable for confining such oil slicks and to a method for removing such slicks and spills from oceans, harbors, bays, lakes, rivers or the like.

As events of recent years have shown, contamination of bodies of eater such as harbors, bays and indeed even open water such as oceans and seas can cause disasterous results both ecologically and aesthetically. Not only are such oil slicks harmful to marine and wild life but they may sometimes wash ashore causing untold damage in resort facilities such as beaches. These oil slicks and spills occur from many sources such as when oil is being transferred from tankers to ships for refueling, when it is being discharged from tankers into refinery storage tanks on shore, from blow-outs on offshore drilling rigs, from sinking or damaging of tankers, from breaks in underwater pipelines, etc.

Several methods of controlling or treating oil spills and slicks have been proposed. For example, various mechanical and quasi-mechanical devices such as fences, booms, skimmers and the like have been employed in an attempt to physically contain and/or remove the oil from the water's surface. In several cases, straw has been strewn over the surface of the oil slick to absorb the oil after which the straw is collected by scooping, racking or some such method or removing it from the surface of the water. While these mechanical devices are relatively effective in calm waters, they are virtually useless in open waters where wave action severely curtails their operation. It has also been proposed to use certain chemical means for treating slicks and spills. Most chemical treatments proposed have involved emulsification of the oil with resultant dispersion in the body of water or some treatment whereby the oil is caused to sink to the ocean floor. Neither of these techniques is desirable from an ecological point of viewed inasmuch as the oil is actually not removed from the body of water but is simply removed from the surface thereof. Moreover, the chemical formulations used to effectuate such treatments are generally harmful per se to marine life thus making their use undesirable.

U.S. Pat. Nos. 3,198,731 and 3,272,758 teach methods and compositions of treating oil slicks wherein a substance is dispersed over the surface of the oil slick which causes the slick to congeal to a substantially stiff mass or gel thus making the slick ameanable to mechanical removal. Specifically, U.S. Pat. No. 3,272,758 teaches the use of a composition comprising soaps of fatty acids derived from wool grease dissolved in a suitable hydrocarbon diluent to cause gel formation of the oil. The fatty acids derived from wool grease and used in the aforementioned compositions are relatively expensive and accordingly the use of the soaps thereof is uneconomical when employed on a large scale which is generally the case in large oil spills such as occur if a tanker sinks or an offshore well blows out. Moreover, the soaps must first be prepared from the wool grease fatty acids which again increases the cost.

SUMMARY OF THE INVENTION

It is therefore an object of the present invention to provide a relatively inexpensive composition of matter suitable for controlling oil slicks and spills on water.

Another object of the present invention is to provide a composition of matter capable of confining an oil slick or spill on the surface of a body of water.

Still another object of the invention is to provide a composition useful in the removal of oil slicks and spills from bodies of water which composition is virtually harmless to marine life.

An important object of the present invention is to provide a method for removing oil slicks and spills from the surfaces of bodies of water.

These and other objects of the present invention will become apparent from the description given herein and the appended claims.

In accordance with the above stated objects, the present invention, in one embodiment, provides a composition of matter suitable for confining oil floating on the surface of water comprising a drying oil and a carrier for the drying oil. The carrier is of a type which is substantially non-toxic to marine life in the amounts employed.

In another embodiment, the above objects are accomplished by a method of treating an oil slick or spill on the surface of a body of water so as to render the slick ameanable to mechanical or other such removal which comprises dispersing on the slick or spill the aforementioned composition in an amount sufficient to effect a confing of the oil slick.

DESCRIPTION OF THE PREFERRED EMBODIMENTS

The novel compositions of the present invention, as noted above, are comprised of a drying oil and a carrier which in most instances will be a solvent for the particular drying oil employed. The term "drying oil" as used applies to a substance which, when applied as a relatively thin film, exposed to air, possesses the property of forming a relatively tough, elastic material or film. These drying oils are, in general, liquids and derived from naturally occuring products but may be synthetically produced. The drying oils contemplated by the compositions of the present invention contain unsaturated fatty acids, glycerol esters of unsaturated fatty acids and/or mixtures thereof. It is postulated that the drying ability of such oils whereby they will form a durable, dry and sometimes even hard film when exposed to air is a result of addition polymerization induced by reaction with oxygen; however, the precise mechanism of chemical oxidation or polymerization responsible for the hardening process of the drying oils is very complex and poorly understood.

As noted, the drying oils generally will be those derived from naturally occuring products. Non-limiting examples of naturally occurring products include linseed oil, tung oil, perella oil, soybean oil, fish oil, castor oil, tall oil, olive oil, cottonseed oil, peanut oil, Chinese wood oil, etc. All of the above mentioned products plus numerous others are known to contain one of the following components: unsaturated fatty acids, glycerides of unsaturated fatty acids or mixtures of the latter two. Compositions in which tall oil is employed have been found to be particularly useful primarily because of their relatively low cost. In general, any naturally occuring product containing at least one of the above specified components in an amount sufficient to bring it within the definition of drying oil as that term is used above can be employed in the composition of the present invention. While, as noted, the drying oils will primarily be derived from naturally occurring products, it is within the scope of the invention to use synthetic materials, i.e., materials containing one of the above enumerated components such as unsaturated fatty acids, their glycerides or mixtures thereof, which have been prepared by mixing the pure components in the desired proportion or by using the pure components themselves. Because of economy, however, it is preferred that the naturally occurring products be employed.

The amount of the drying oil employed in the composition of the present invention will depend to some extent upon the amount of unsaturated fatty acid, their glycerides or the mixture thereof present in the particular drying oil. If the drying oil is prepared synthetically, this can be carfully controlled. When the drying oil comprises a naturally occurring product such as those enumerated above, the amount of the naturally occurring product used in the compositions will be dependent on the amount of the particular unsaturated fatty acids, fatty acid glycerides and/or the mixtures thereof present. In general, the drying oil will be present in the compositions of the present invention in amounts ranging from about 10 percent to about 50 percent by weight and more preferably from about 15 percent to about 35 percent by weight.

The carrier used in preparing the compositions of the present invention should be one in which the drying oil is substantially soluble and which in the amounts used in the composition and in the actual confining operation will not be harmful to marine life. It will be recognized that virtually any solvent or carrier if used in high enough concentrations may cause some damage to marine life at least in the immediate vicinity of its usage. However, there are numerous liquids which can be used as carriers which have little or no effect upon marine life in the concentrations employed. Non-limiting examples of such carriers include alcohols such as ethanol, propanol, butanol; esters such as ethyl acetate, amyl acetate and the like; ketones such as acetone, methyl isobutyl ketone, etc.; ethers such as diethyl ether, diisopropyl ether and the like, etc. Particularly preferred because of availability, and relative low cost are the liquid alcohols and especially ethanol. Ethanol is easily obtainable, relatively non-toxic to marine life even in high concentrations, an excellent carrier for most of the natural as well as synthetic drying oils and readily miscible with water. While the term carrier is employed, it is to be understood that in most cases the compositions of the present invention will be solutions such that the carrier will be a solvent as that term is commonly employed. However, due to the fact that in certain instances, particularly in the case of drying oils derived from natural sources, certain amounts of insoluble impurities may be present such that the compositions formed are not true solutions but rather contain some suspended matter, the term carrier is employed so as to encompass such situations.

In general, the carrier will be present in amounts ranging from about 50 percent to about 90 percent by weight and more preferably from about 65 percent to about 85 percent by weight.

In employing the compositions of the present invention, it is advantageous to employ a metallic soap catalyst which tends to speed up the confining action of the composition on the oil spill. These metallic soap catalysts are generally comprised of water insoluble soaps of materials such as fatty acids as for example, stearic acid, oleic acid and the like; naphthenic acids; rosin; tall oils and other such naturally occurring products with heavier metals such as aluminum, calcium, cadmium, cobalt, copper, iron, lead, manganese, nickel, tin or zinc. Cobalt naphthenate has been found to be a particularly desirable metallic soap catalyst. The insoluble metallic soap catalysts are generally obtained either by heating the respective fatty acid or the like with a metallic oxide or carbonate or by the reaction of a soluble sodium or potassium salt of the fatty acid, etc. with a solution of the particular heavy metal salt. The metallic soap catalysts are to be distinguished from the ordinary soaps which are the soluble salts of the fatty acids containing from about 12 to 22 carbon atoms and are generally the sodium, potassium or lithium salts of such fatty acids.

When a metallic soap catalyst is employed in the compositions of the present invention, it can be present in the composition as it is applied to the oil slick or spill or in the alternate, a composition comprised of the drying oil and the carrier can be applied to the oil slick after which an amount of the metallic soap catalyst sufficient to fall within the above specified percentage can be applied to the oil slick.

Generally speaking, the metallic soap catalyst will be present in the compositions of the present invention in amounts ranging from about 1 percent to about 10 percent by weight and preferably from about 2 percent to about 6 percent by weight.

As noted, the metallic soap catalyst is not absolutely necessary as the compositions disclosed will confine the oil slick even in the absence of such. However, it has been found that by the addition of one of the metallic soap catalyst the containment action of the compositions is speeded up considerably in most cases.

It is to be understood that the term "oil" as used herein refers not only to crude oil but to various fractions thereof such as for example, gasoline, fuel oil, kerosene or any of the common petroleum cuts derived from petroleum. When applying the compositions of the present invention to the oil slick or spill, it will be apparent that the amount of composition employed will be dependent upon the extent of the slick both as to its thickness and the amount of area covered by the slick. As a general rule however, from about one half to about twice the amount by volume of the oil spill, applied over the entire area of the spill, will suffice to effect the desired confining of the oil. Greater amounts however can be used, the only disadvantage being that the cost of application rises without any appreciable increased effect on the confining rate.

When employing the compositions of the present invention on an oil slick or spill, the composition, which of course is in liquid form, can be sprayed on from hoses from a passing ship, can be dropped from aircraft at low levels or can be applied in any manner whereby the entire area of the oil slick can have dispersed upon it the compositions disclosed herein. In general, it is preferable to apply the composition in a fine spray such as an aerosol to insure intimate contact with the oil slick. Within a short time, i.e., from one to five minutes, after the composition has been dispersed upon the oil slick, a confining barrier of the composition will begin to form on the surface and around the peripheral edges of the oil slick actually reducing the area of the slick. The time for forming the confining barrier will of course depend on the size of the slick and the amount of the confining composition employed. Once this confining action has taken place, the slick or spill may be easily removed by mechanical means such as scooping. As noted above, the advantages of using the compositions and methods of the present invention are most apparent where wave action would make the use of mechanical devices impossible. In fact, a certain amount of wave action is desirable in that it tends to effect a more rapid formation of the confining barrier which in turn of course facilitates removal of the oil preferably by mechanical means.

In order to more fully demonstrate the invention, the following non-limiting examples are presented. Unless otherwise indicated, all parts and percentages are by weight.

EXAMPLE 1

To a 500ml breaker approximately four inches in diameter and containing around 300 mls of tap water at about 72°F was added 1 cc of 30°API crude oil. The oil quickly spread over the surface of the water in the beaker forming a slick on the surface thereof which substantially covered the entire surface area of the water in the beaker. One cc of a solution containing 23 percent of a drying oil known as FLOAT R-22 marketed by Tenneco Chemicals, Inc., Pensacola, Florida, 74 percent ethanol and 3 percent cobalt naphthenate was atomized onto the oil floating on the surface of the water in the breaker The FLOAT R-22 which is a tall oil derivative had the following properties:

| | |
|---|---|
| Acid Value | 174.2 |
| Rosin Acids | 9.8% |
| Fatty Acids (mainly oleic & linoleic) | 79.0% |
| Esters and Unsaponifiables | 11.6% |
| Titre below −8°C | 16°F |

The beaker was agitated for 2-3 minutes and it was noted that a containing film soon covered the oil slick and formed a barrier around the edges of the slick. It was further observed that the area of the slick was substantially reduced. Upon vigorous shaking, the oil slick, upon cessation of the agitation gathered in a relatively confined area and remained contained therein.

EXAMPLE 2

The procedure in Example 1 is followed with the exception that the drying oil is a material known as ACONEW 500 marketed by Tenneco Chemicals, Inc., Pensacola, Florida. ACONEW 500 comprises distilled tall oil fatty acids and has the following properties: Acid Number 193 Saponification Number 195 Iodine Number 129 Rosin Acids 2.7% Fatty Acid 94.8% Unsaponifiables 2.5% Titre 0°C 4
Using the ACONEW 500, similar results to those observed in Example 1 are obtained.

EXAMPLE 3

The procedure of Example 1 is repeated except a material known as ACOFOR, marketed by Tenneco chemicals, Inc., Pensacola, Florida is employed as the drying oil. ACOFOR comprises distilled tall oil fatty acids and has the following properties.

| | |
|---|---|
| Acid Number | 193 |
| Saponification Number | 195 |
| Iodine Number | 129 |
| Rosin Acids | 2.7% |
| Fatty Acids | 94.8% |
| Unsaponifiables | 2.5% |
| Titre 0°C | 4 |

Results similar to those observed in Example 1 are obtained.

EXAMPLE 4

The procedure of Example 1 is repeated with the exception that a material known as ACOSIX marketed by Tenneco Chemicals, Inc., Pensacda, Florida is employed as the drying oil. ACOSIX has the following properties:
Acid Numer 190 Saponification Number 192 Iodine Number 140 Rosin Acids 25% Fatty Acids 73% Unsaponifiables 2% Titre 0°C 1
The results obtained using the ACOSIX are similar to those observed in Example 1.

Various modifications, changes, alterations and additions can be made in the present method, and in the conditions and reagents for the method. All such modifications, changes, alterations and additions as are within the scope of the appended claims form a part of the present invention.

We claim:

1. A composition of matter useful in effecting confining of an oil slick on the surface of water consisting essentially of from about 10 to about 50 percent by weight of a drying oil, said drying oil comprising a material containing a major proportion of a component selected from the class consisting of unsaturated fatty acids, glycerides of unsaturated fatty acids and mixtures thereof, from about 50 to about 90 percent by weight of a carrier selected from the class consisting of liquid alcohols, ketones and ethers, and from about one to about 10 percent by weight of a water insoluble metallic soap catalyst.

2. The composition of claim 1 wherein said carrier comprises a liquid alcohol.

3. The composition of claim 2 wherein said alcohol comprises ethanol.

4. The composition of claim 1 wherein said metallic soap catalyst comprises cobalt naphthenate.

* * * * *